(12) United States Patent
Bussit et al.

(10) Patent No.: US 9,279,448 B2
(45) Date of Patent: Mar. 8, 2016

(54) BEARING RELEASE, IN PARTICULAR FOR A STEERING COLUMN

(71) Applicant: Aktiebolaget SKF, Göteborg (SE)

(72) Inventors: Sylvain Bussit, Monnaie (FR); Daniel Jansen, Tours (FR); Thomas Lepine, Villandry (FR); Bruno Montboeuf, Cerelles (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 13/959,809

(22) Filed: Aug. 6, 2013

(65) Prior Publication Data
US 2014/0037240 A1 Feb. 6, 2014

(30) Foreign Application Priority Data

Aug. 6, 2012 (FR) ....................................... 1202190
Dec. 7, 2012 (FR) ....................................... 1203324

(51) Int. Cl.
*F16C 33/60* (2006.01)
*F16C 19/06* (2006.01)
*F01C 21/02* (2006.01)
*F16C 41/00* (2006.01)
*F16C 25/08* (2006.01)
*F16C 33/61* (2006.01)

(52) U.S. Cl.
CPC .................. *F16C 19/06* (2013.01); *F01C 21/02* (2013.01); *F16C 25/083* (2013.01); *F16C 33/60* (2013.01); *F16C 33/61* (2013.01); *F16C 41/001* (2013.01); *F16C 2380/27* (2013.01)

(58) Field of Classification Search
CPC ........ F16C 19/06; F16C 25/083; F16C 33/60; F16C 33/61; F16C 41/001; F16C 2380/27; F01C 21/02
USPC ......... 384/477, 484, 486, 490, 499, 500, 505, 384/510, 513, 517, 563
See application file for complete search history.

(56) References Cited

U.S. PATENT DOCUMENTS 3,129,985 A * 4/1964 Watson ......................... 384/486
3,330,607 A * 7/1967 Delp ............................. 384/477

(Continued)

FOREIGN PATENT DOCUMENTS

| DE | 4229199 A1 | 3/1994 |
|---|---|---|
| DE | 9400766 U1 | 3/1994 |
| EP | 0042325 A1 | 12/1981 |
| EP | 1985519 | * 3/2008 |
| EP | 1956254 A1 | 8/2008 |

*Primary Examiner* — James Pilkington
(74) *Attorney, Agent, or Firm* — Bryan Peckjian; SKF USA Inc. Patent Dept.

(57) ABSTRACT

A bearing device which comprises an internal ring and an external ring, which are each provided with a bearing path for rolling elements which are arranged between the rings in contact with the bearing paths. At least one of the two rings comprises a casing which is provided with an axial portion, two radial portions at the ends thereof. This device also comprises two bearing elements which are mounted in the casing and which each form a bearing path, and at least one pretensioning element which is produced from resilient material and which is arranged between one of the radial portions of the casing and one of the bearing elements. A pretensioning element is mounted in the casing of a first ring in frictional contact with the second ring in order to apply a resistant torque during the rotation of one ring relative to the other.

20 Claims, 9 Drawing Sheets

(56) References Cited

U.S. PATENT DOCUMENTS

| | | | |
|---|---|---|---|
| 3,876,266 A * | 4/1975 | Rozentals | 384/536 |
| 5,193,917 A * | 3/1993 | Adler et al. | 384/517 |
| 6,158,896 A * | 12/2000 | Zernickel et al. | 384/506 |
| 6,846,110 B2 * | 1/2005 | Lutz et al. | 384/537 |
| 2011/0194795 A1 * | 8/2011 | Muramatsu et al. | 384/513 |

* cited by examiner

BEARING RELEASE, IN PARTICULAR FOR A STEERING COLUMN

CROSS-REFERENCE TO RELATED APPLICATION

This application is a United States Non-Provisional Utility Patent Application claiming the benefit of France Patent Application Number 1203324 filed on 7 Dec. 2012, and France Patent Application Number 1202190 filed on 6 Aug. 2012, which are incorporated herein in their entireties.

TECHNICAL FIELD

The present invention relates to the field of roller bearings, in particular pretensioned bearings, which comprise an internal ring and an external ring, one or more rows of rolling elements between the two rings, for example, balls. These bearings may be, for example, those used for steering columns of motor vehicles, thermal rotary engines, industrial electric motors or electromechancial actuators.

BACKGROUND ART

Generally, a steering column for a motor vehicle comprises a shaft, one of the ends of which is connected to a steering wheel which is actuated by the driver and the other end of which is connected to mechanical elements, such as a rotary transmission member or gear elements. The shaft of the steering column is mounted inside a housing by means of two rolling devices.

European patent application EP 1 956 254 A1 describes a pretensioned bearing which comprises an internal ring, an external ring which is provided with a casing in which two annular snap rings are mounted in order to form rolling paths, a row of balls which is arranged between the snap rings and the internal ring, and a pretensioning element which is produced from a resilient material and which is arranged axially between a first radial portion of the casing and one of the annular snap rings. A second annular portion of the casing is pressed against the other annular snap ring in order to apply an axial compression force to the pretensioning element and thus to preload the bearing radially and axially at the same time.

Conventionally, it is required that such steering column bearings operate with a rotation torque which is as small and as constant as possible. However, it may be desirable for an automotive application, in particular for top-of-the-range motor vehicles, to increase the resistant torque of the rotation of the steering column compared with mid-range vehicles. The driver then has to apply a greater torque to the steering wheel and thus has a sensation of the sturdiness of the vehicle. This driving sensation is very important since it contributes to the quality image, which a driver may have of a vehicle.

These are the constraints, which the invention is most specifically intended to overcome, by providing a new bearing device, which is simple and economical to produce and assemble whilst ensuring a high level of resistant torque.

DISCLOSURE OF INVENTION

To this end, the invention relates to a bearing device which comprises an internal ring and an external ring, which are each provided with a bearing path for roller elements which are arranged between the rings in contact with the bearing paths. At least one of the two rings comprises a casing, which is provided with an axial portion and two radial portions at the ends thereof. The device also comprises two bearing elements which are mounted in the casing and which each form a bearing path, and at least one pretensioning element which is produced from resilient material and which is arranged between one of the radial portions of the casing and one of the bearing elements such that the pretensioning element may exert only an axial force on the one of the two bearing elements. The pretensioning element may only contact one of the two bearing elements on a surface over which the axial force is being applied.

In accordance with the invention, a pretensioning element that is mounted in the casing of a first ring is in frictional contact with the second ring in order to apply a resistant torque during the rotation of one ring relative to the other.

Owing to the invention, the torque of the bearing device and consequently of the steering column of the motor vehicle is increased.

The bearing is thus particularly economical since a supplementary function has been produced without for all that adding an additional component to the device or carrying out substantial modifications to the majority of the constituent elements of a known pretensioned bearing device.

The pretensioning element is thus compressed in the housing of one of the rings in order to ensure zero play in the bearing, as is preferable in steering column bearings, but is also in frictional contact, which may be direct or may be by means of a wear element, on a surface of the other ring.

According to advantageous but non-obligatory aspects of the invention, such a bearing device may include one or more of the following features, taken in any technically permissible combination:

At least one of the bearing elements mounted in the casing of one of the rings is an annular snap ring.

At least one of the bearing elements mounted in the casing of one of the rings is a crimped metal ring which comprises a concave toric portion which acts as a bearing track for the rolling elements.

The rolling elements are balls.

The rolling elements are held circumferentially spaced apart by a cage, the cage being able to be provided with an annular projection, which is arranged axially at the side opposite the pretensioning element.

The internal ring is of the solid type with a toroidal surface that forms a bearing path.

The pretensioning element is formed from a resilient material based on elastomer material, for example, of the nitrile rubber type, polyurethane or ethylene propylene diene monomer (EPDM).

The pretensioning element is formed from a resilient material comprising an additive for resistance to wear caused by friction, for example, graphite.

The pretensioning element is annular and has in the free state a rectangular cross-section with a bore in frictional contact with the second ring.

The pretensioning element is annular and has in the free state a first portion having a rectangular or square cross-section and a second portion having an axial length which is strictly less than the axial length of the first portion, this second portion extending radially from the first portion to the inner side of the bearing and having a bore in frictional contact with the second ring.

The second portion of the pretensioning element is formed from a root on the first portion that is axially offset towards the rolling elements.

The second portion of the pretensioning element has at least one bent portion in frictional contact with the second ring.

The internal surface of the pretensioning element, which forms the bore, has reliefs in frictional contact with the second ring.

The pretensioning element is retained by means of an axial retention portion in order to prevent any expansion or radial creep of the portion of the pretensioning element that is compressed between a radial portion of the housing and a bearing element.

The casing is provided with the axial retention portion, which is formed from the end of the radial portion against which the pretensioning element is compressed and which extends axially in the direction of the rolling elements. The axial, radial and retention portions form an annular chamber that is substantially closed at three sides and open axially at one side in which the first portion having a rectangular or square cross-section of the pretensioning element is mounted.

The axial retention portion is an element that is inserted inside the material of the pretensioning element.

The pretensioning element is overmolded around the axial retention portion.

The axial retention portion is extended by a radial retention portion, which is formed from an end of that axial retention portion and which extends substantially radially in the direction of the inner side of the bearing.

The radial retention portion extends partially into the second portion of the pretensioning element in order to prevent any axial deformation of that second portion and thus to ensure a constant frictional contact with the second ring.

The invention also relates to a steering column for a motor vehicle comprising a housing, a shaft and a bearing device as described above, arranged between the housing and the shaft. The internal ring may be mounted on the shaft in contact with a shoulder that ensures its axial positioning.

The invention also relates to a rotary engine which is provided with a fixed housing, a distribution crankshaft at the output of the rotary engine, an external pulley which is driven by the rotary engine by means of the distribution crankshaft and a bearing device in accordance with any one of the preceding aspects and arranged radially between the distribution crankshaft and the fixed housing.

BRIEF DESCRIPTION OF DRAWINGS

The characteristics and advantages of the present invention appear more clearly from the following description given by way of non-limiting indication, and with reference to the accompanying drawings, in which.

DETAILED DESCRIPTION

Figure 1:
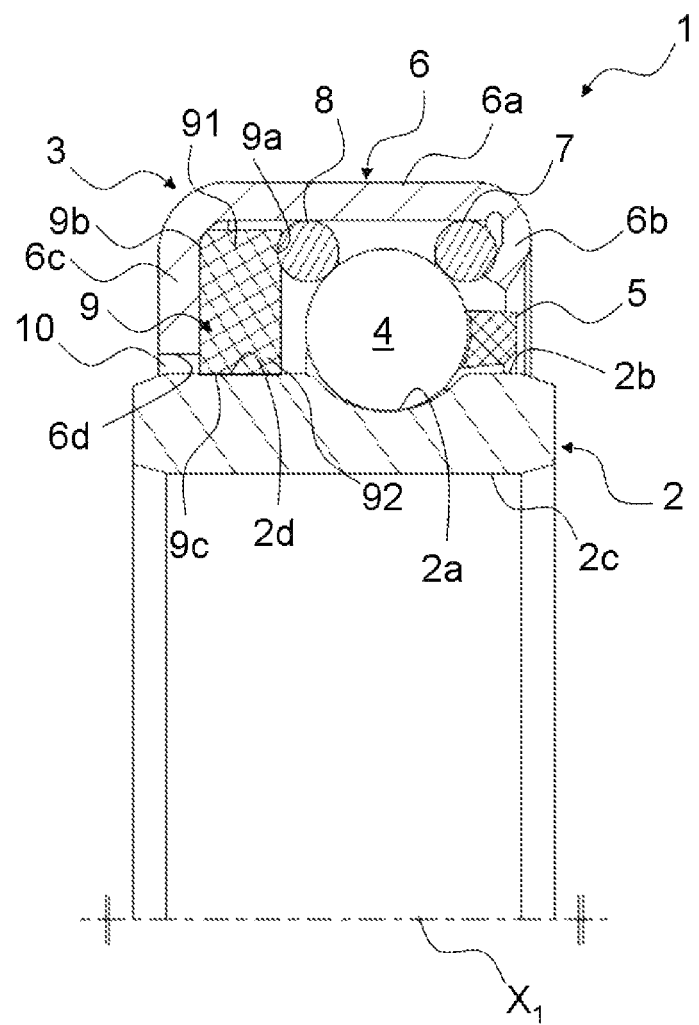
FIG. 1 presents an axial schematic half section of a first exemplary bearing device.

As illustrated in FIG. 1, a bearing device 1 comprises an internal ring 2, an external ring 3, a row of rolling elements 4, in this instance balls, and a cage 5 for maintaining the circumferential space of the rolling elements 4.

For this embodiment and for the following ones, the adjectives "axial" and "radial" and the adverb "axially" are defined in relation to a central axis X1 of the bearing 1 which is a relative rotation axis of the rings 2 and 3. In this manner, an axial part or portion is parallel with the axis X1, whilst a radial part or portion is perpendicular relative to this axis and surrounds it. A surface is said to be axial when it extends perpendicularly relative to the axis X1 and radial when it extends perpendicularly relative to a normal of this axis. For example, a radial portion is provided with an internal surface that is orientated towards the axis X1 and an external radial surface that is orientated in the opposing direction to this axis.

The internal ring 2 is of the solid type and has a toroidal surface 2a which is produced, for example, by means of machining, on an external cylindrical surface 2b and which forms a bearing path for the rolling elements 4. In the example illustrated in FIGS. 1 to 7, the radius of curvature of the toroidal surface 2a is slightly greater than the radius of the rolling elements 4. The internal cylindrical surface 2c may mount directly to a steering column of a motor vehicle, or similar shaft structure.

The external ring 3 comprises an annular casing 6, for example, formed from sheet steel, two bearing elements 7 and 8, in this instance annular snap rings which are formed, for example, from a steel wire folded in the form of a torus with the ends thereof facing each other, and a pretensioning element 9 which is produced from resilient material.

The casing 6 comprises an axial portion 6a and two radial portions 6b and 6c which are formed at the ends of the axial portion 6a and which extend radially towards the inner side of the bearing device 1 from the axial portion 6a. A space 10 is provided between the internal axial edge 6d of the radial portion 6c and the external cylindrical surface 2b of the internal ring 2, in order to prevent any risk of contact with the casing 6.

The bearing element 7 is arranged in contact with the internal radial surface of the axial portion 6a (also referred to as the radially inner axially extending surface) and the internal axial surface of the radial portion 6b. It is also in contact with the rolling elements 4. The bearing element 8 is arranged in contact with the rolling elements 4, the radially inner axially extending surface of the axial portion 6a and with a first axial surface 9a of the pretensioning element 9. The pretensioning element 9 is in contact with the internal axial surface of the radial portion 6c of the casing 6 via a second axial surface 9b. The bearing elements 7 and 8 thus each provide a point of contact with the rolling elements 4 which thus form bearing paths and which allow axial and radial loads to be supported. The pretensioning element 9 is compressed between the bearing element 8 and the radial portion 6c. The closure of the bearing device and in particular the external ring 3 by means of enclosure of the bearing elements 7 and 8, the rolling elements 4 and the pretensioning element 9 having axial resilient properties between the radial portions 6b and 6c allows the play to be eliminated and permanent pretensioning. The pretensioning element 9 may be resiliently deformed under the effect of the force applied thereto by the bearing element 8.

In accordance with the invention, the pretensioning element has a bore 9c in frictional contact, in this instance direct contact, with a portion 2d of the external cylindrical surface 2b of the internal ring 2.

The pretensioning element 9 thus has a first external portion 91 which is compressed axially between the casing 6 and the bearing element 8 and which provides a pretensioning function and a second internal portion 92 which extends in particular radially towards the axis X1 beyond the internal radial edge 6d into the space 10, and ensuring, when one ring rotates relative to the other, a greater friction torque than when the element 9 is not present.

In accordance with a first embodiment illustrated in FIG. 1, the pretensioning element 9 is annular, has a rectangular cross-section and has a contact surface 2d with respect to the very wide internal ring 2 whilst retaining a simple geometry. Those of ordinary skill in the art will appreciate that the casing 6 and bearing elements 7, 8 can also form the internal ring while the external ring is made of a solid type similar to the internal ring of FIG. 1. In such an arrangement, the bearing elements 7, 8 would contact the radially outer axially extending surface of the casing 6, and, the bore 9c of the pretensioning element 9 would be in frictional contact with the internal cylindrical surface of of the outer ring.

Figure 2:
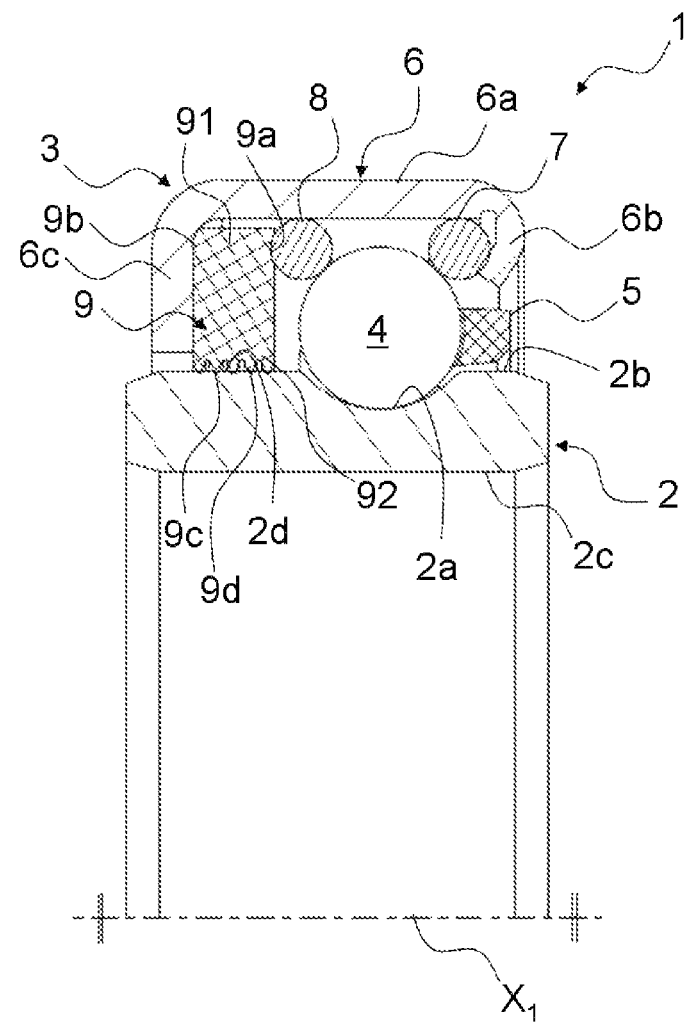
FIG. 2 presents an axial schematic half section of a second exemplary bearing device configuration, wherein a pretensioning element defines a bore comprising reliefs formed within a surface thereof.

A second embodiment illustrated in FIG. 2, in which elements which are identical have the same reference numerals, differs from the first embodiment in that the internal surface which forms a bore 9c of the pretensioning element 9 has reliefs 9d (also referred to as "projections" in the claims) which are in frictional contact with the portion 2d of the external cylindrical surface 2b of the internal ring 2.

The reliefs 9d, which alternate with hollow zones, may have cross-sections of various shapes, for example, circular, elliptical, triangular, square or rectangular shapes. In accordance with the definition of the cross-section of the reliefs 9d, the contact surface 2d with the internal ring 2, which may be planar or point-like, and their number, it is possible to modulate the friction torque in accordance with the applications.

Figure 3:
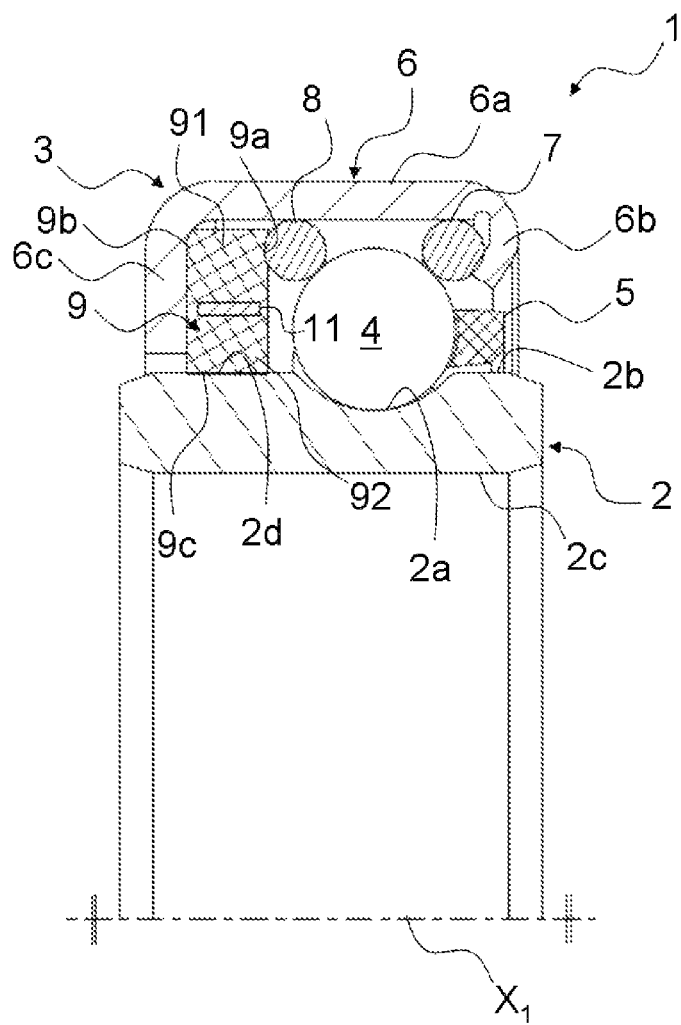
FIG. 3 presents an axial schematic half section of a third exemplary bearing device configuration, wherein an axial retention portion is annular and inserted into the pretensioning element.

A third embodiment illustrated in FIG. 3, in which elements which are identical have the same reference numerals, differs from the preceding embodiments in that an axial retention portion 11 is annular and inserted into the pretensioning element 9. The axial retention portion 11 is substantially parallel with the axis X1 of the bearing. It is advantageously produced from a rigid material, for example, metal. The pretensioning element 9 is advantageously overmolded around the axial retention portion 11.

Such an axial retention portion 11 prevents any expansion or radial creep of the first portion 91 of the pretensioning element 9 that is compressed axially between the casing 6 and the bearing element 8. This also limits axial and/or radial displacement of the second portion 92 owing to excessive deformation of the first portion 91, and which displacement could eliminate the contact with the internal ring 2 or increase the level of friction whereas it is preferable for it to remain constant.

In accordance with other embodiments illustrated in FIGS. 4 to 7, in which elements which are identical have the same reference numerals, the pretensioning element 9 differs from the above embodiments in that the first external portion 91 which is compressed between the casing 2 and the bearing element 8 and which provides a pretensioning function has an axial length which is greater than the axial length of the internal second portion 92 which ensures the contact with the internal ring 2.

A bearing device 1 with a pretensioning element 9 having such a geometry may have a substantially reduced weight. The second portion 92 may have various geometric shapes and afford the possibility of optimising the contact surface with the internal ring 2, and consequently the friction torque, in accordance with the applications, as will be described below.

In all of the embodiments illustrated in FIGS. 4 to 7, the second portion 92 is formed from a root 9e in extension of an internal radial surface 9f of the first portion 91. The internal radial surface 9f is defined by the variation in axial length between the first and second portions 91 and 92. The root 9e is advantageously at the side of the rolling elements 4, whilst the internal axial surface 9f is at the side of the radial portion 6c of the casing.

According to these embodiments, the casing 6 also comprises an axial retention portion 11a which is formed at the end of the radial portion 6c and which extends axially towards the rolling elements 4. The axial retention portion 11a is opposite the internal radial surface 9f of the pretensioning element 9 and is substantially parallel therewith. Such an axial retention portion 11a prevents any expansion or radial creep of the first portion 91 of the pretensioning element 9 which is compressed between the casing 6 and the bearing element 8.

Figure 4:
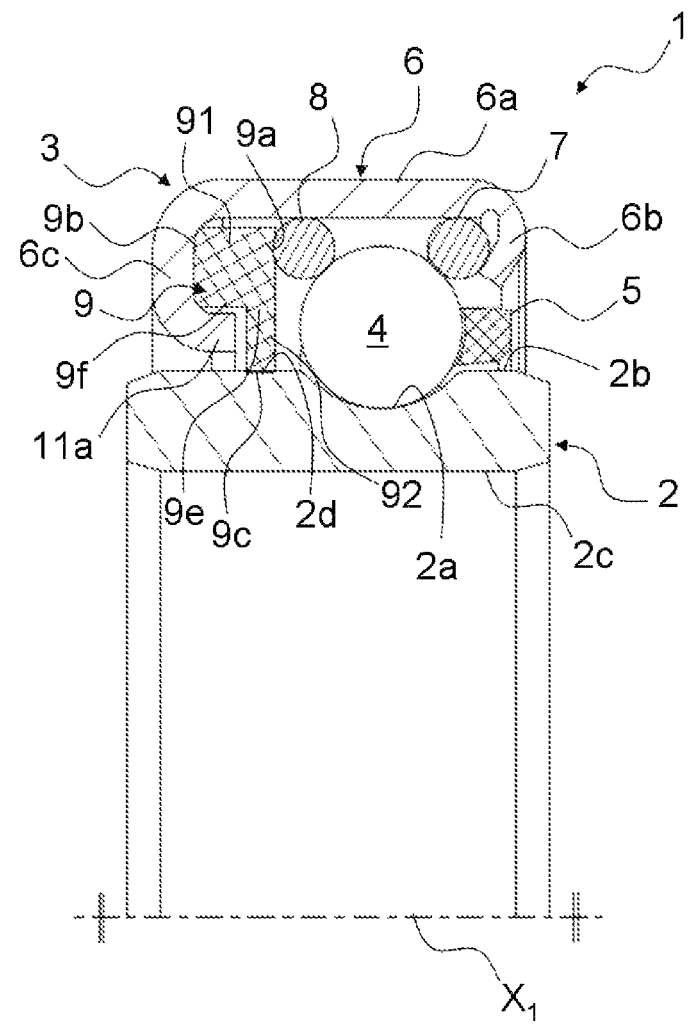
FIG. 4 presents an axial schematic half section of a forth exemplary bearing device configuration, wherein the pretensioning element is provided in a first exemplary configuration.

The embodiment illustrated in FIG. 4 shows a pretensioning element 9 with a first external portion 91 having a substantially rectangular shape and having a larger axial dimension than the internal second portion 92, which is also rectangular. The radial surface 9a of the pretensioning element extends from the first portion 91 as far as the end of the second portion 92.

Figure 5:
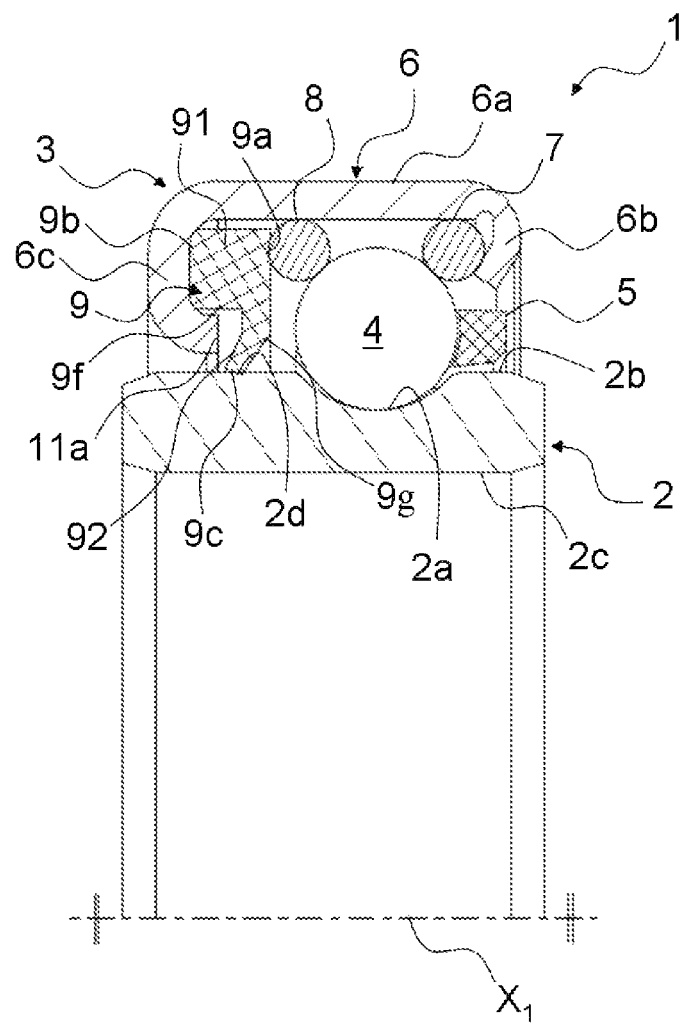
FIG. 5 presents an axial schematic half section of a forth exemplary bearing device configuration, wherein the pretensioning element is provided in a second exemplary configuration.

The embodiment illustrated in FIG. 5 differs from the preceding embodiment in that the internal second portion 92 has a bend 9g that is directed in the opposite direction to the rolling elements 4. Such a second portion 92 thus has reduced contact with the internal ring 2. The radial position of the bend 9g on the second portion 92 may be central or close to the first portion 91 or the internal ring 2.

Figure 6:
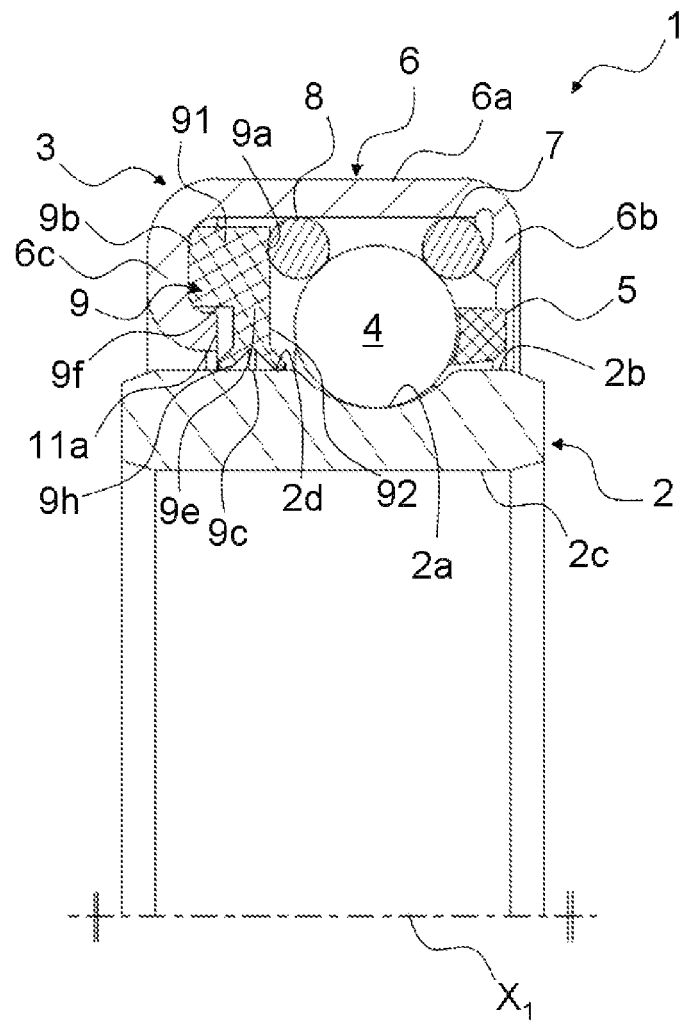
FIG. 6 presents an axial schematic half section of a forth exemplary bearing device configuration, wherein the pretensioning element is provided in a third exemplary configuration.

The embodiment illustrated in FIG. 6 differs from the embodiment above in that the second internal portion 92 has a plurality of bent portions 9h in frictional contact with the internal ring 2.

Figure 7:
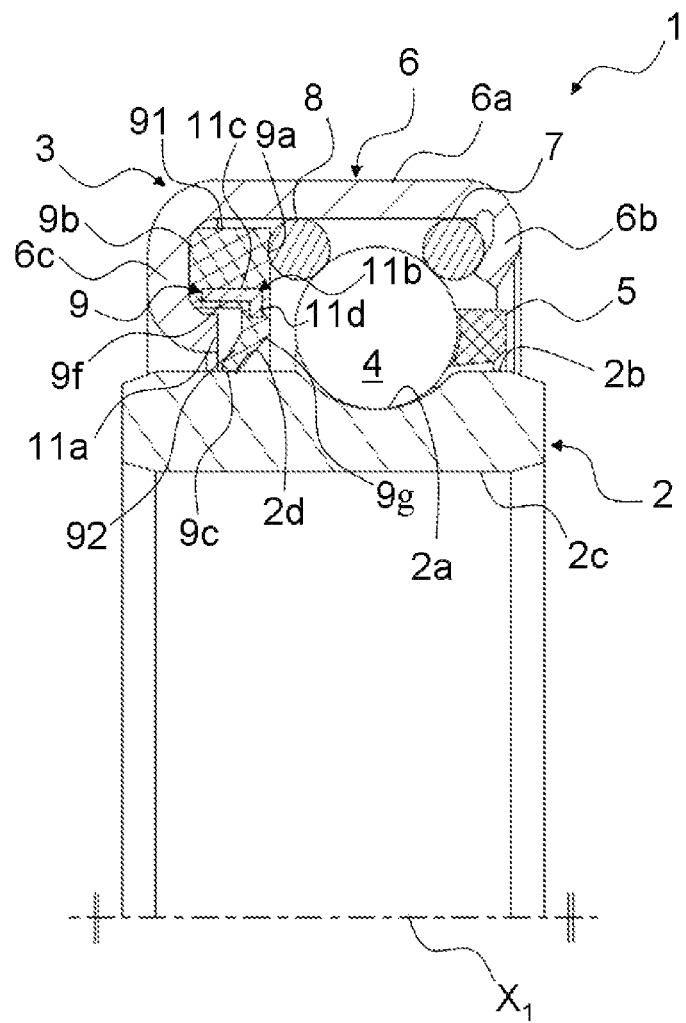
FIG. 7 presents an axial schematic half section of a forth exemplary bearing device configuration, wherein the pretensioning element is provided in a fourth exemplary configuration.

The embodiment illustrated in FIG. 7 differs from the embodiments above in that a retention portion 11b is inserted into the pretensioning element 9. The retention portion 11b is substantially parallel with the bearing axis and is advantageously produced from a rigid material, for example, metal. The pretensioning element 9 is advantageously overmolded around the retention portion 11b. In this embodiment, the retention portion 11b has a first axial portion 11c and a second radial portion 11d formed from one end of the axial portion 11c and directed towards the inner side of the bearing.

Advantageously, this radial portion 11d extends partially into the second portion 92 and allows any axial deformation of the second portion 92 to be prevented and thereby ensures constant frictional contact with the internal ring 2.

Figure 8:
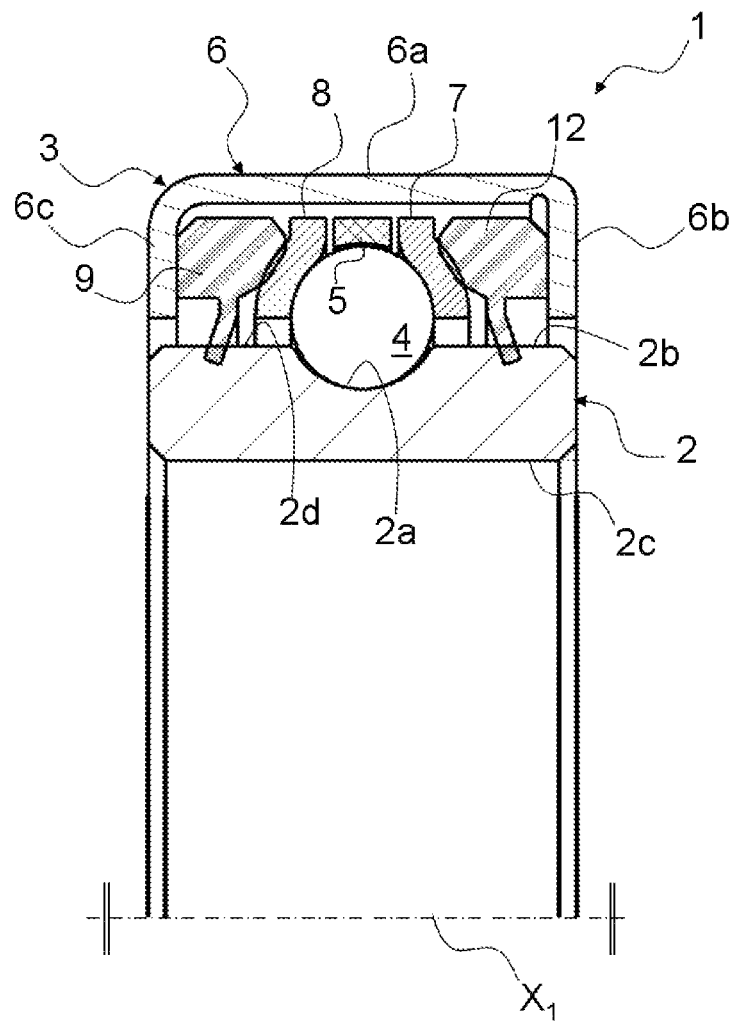
FIG. 8 presents an axial schematic half section of a fifth exemplary bearing device configuration.

The embodiment illustrated in FIG. 8 differs from the embodiments above in that the bearing device 1 is radially symmetrical relative to a radial axis that extends via the centre of the rolling elements 4. The bearing device 1 comprises two pretensioning elements 9, 12 that are radially symmetrical relative to each other and are compressed between the radial portions 6b, 6c of the casing 6 and the bearing elements 7, 8, respectively.

In the embodiment illustrated in FIG. 8, the pretensioning elements 9, 12 are of the same type as the one described for FIG. 5.

In the embodiment illustrated in FIG. 8, the bearing elements 7, 8 are radially symmetrical and are crimped metal rings which each comprise a concave toric portion 7a, 8a that acts as a bearing track for the bearing elements 4.

Figure 9:
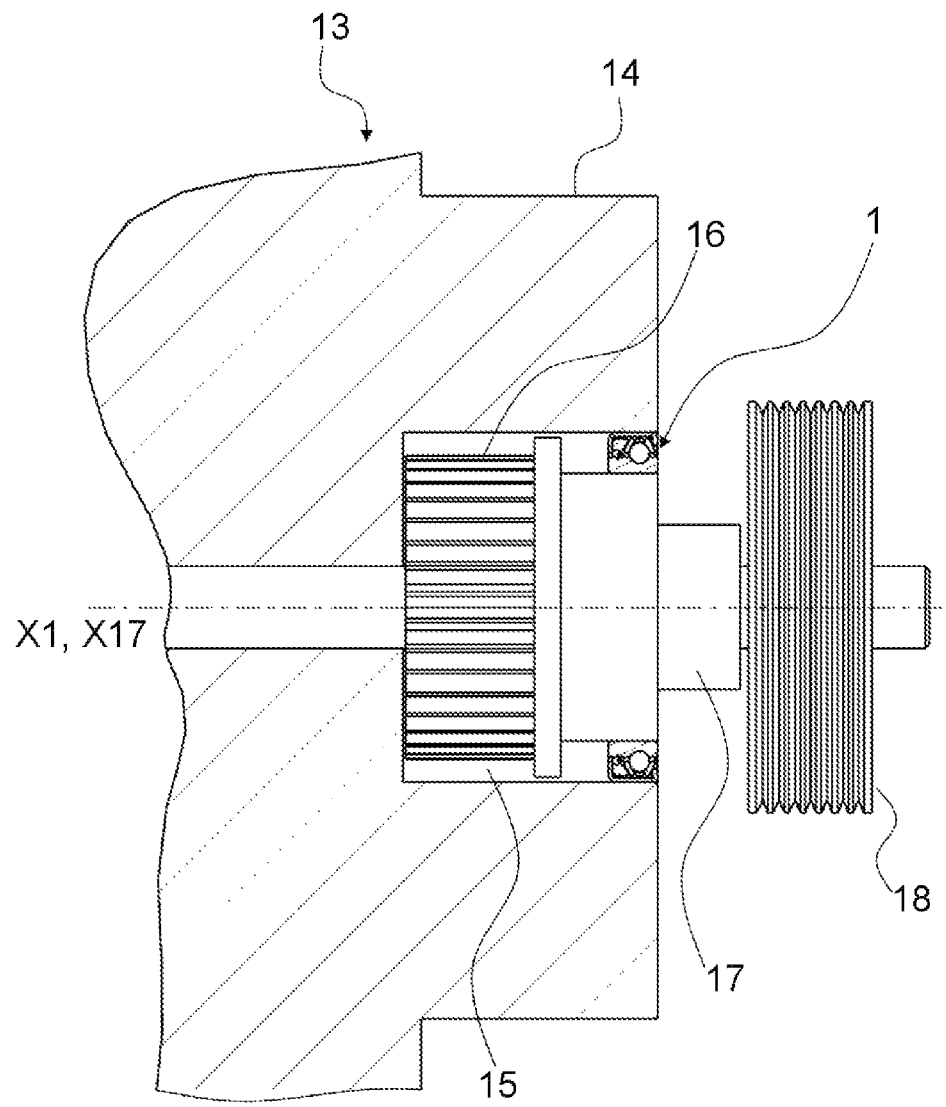
FIG. 9 presents an axial schematic partial half section of a bearing device in accordance with the present invention integrated into a rotary engine.

FIG. 9 describes a rotary engine 13 which comprises a fixed housing 14, in which all the mechanical and electrical elements of the engine cooperate, in particular the rotating shafts, the bearings, the connecting rods, pistons, electronic control members, etcetera, in order to ensure the operation of the engine. The rotary engine 13 comprises an output 15 that is formed in the housing 14, for example, by means of a recess in the embodiment illustrated in FIG. 9, via which rotating elements which are caused to cooperate with other pieces of mechanical equipment emerge.

The elements that emerge from the rotary engine 13 comprise a distribution pulley 16 that is mounted on a rotating distribution crankshaft 17, which has an axis X17 and which ensures driving of an external pulley 18. The external pulley 18 cooperates with a belt (not illustrated) which is mounted on the external periphery thereof and which allows other rotating elements to be driven.

The rotary engine 13 also comprises a bearing device 1 in accordance with the invention and in accordance with any one of the embodiments described above.

The bearing device 1 has as an axis of rotation X1 that is aligned with the axis X17. The bearing device 1 is mounted in the bore formed by the recess of the output 15 of the fixed housing 14 and around the distribution crankshaft 17.

In conventional manner, in the prior art, such rotary engines 13 are not provided with an output bearing 15 but only with a sealing means that is mounted in the bore formed by the recess of the output 15 of the fixed housing 14 and in sliding contact with the distribution crankshaft 17. The use of such a bearing device 1 at the output 15 of a rotary engine 13 allows, on the one hand, the rotation of the distribution crankshaft 17 to be supported close to the end thereof which is surmounted by the external pulley 18, allows an optimised sealing function to be ensured by the at least one pretensioning element 9, 12 mounted on one ring and in contact with the other, and allows the transmission torque supplied by the engine to the external pulley 18 via the distribution crankshaft 17 to be controlled.

The technical features of the embodiments and variants envisaged above may be combined with each other.

What is claimed is:

1. A bearing device comprising:
 a casing provided with an axial portion and two radial portions at the ends thereof, wherein the axial portion of the casing is of constant diameter such that the two radial portions connect to the axial portion at a same radial distance from a central axis of the bearing device, the axial portion having a radially inner axially extending surface,
 an internal ring located within the casing and having an internal ring bearing path;
 an external ring located within the casing, the external ring being formed by two bearing elements disposed against the radially inner axially extending surface, each bearing element forming an external ring bearing path;
 rolling elements, wherein the rolling elements are arranged between the internal ring and the external ring and in contact with the internal ring bearing path and the external ring bearing path;
 at least one pretensioning element which is produced from resilient material and which is arranged between one of the radial portions of the casing and one of the two bearing elements of the external ring such that the at least one pretensioning element exerts only an axial force on the external ring and that the at least one pretensioning element only contacts the external ring on a surface over which the axial force is being applied, the pretensioning element is further arranged such that in an installed state an outer radial surface of the pretensioning element is not in contact with the radially inner axially extending surface and is also not in contact with the external ring, and
 wherein the at least one pretensioning element is mounted in the casing and in frictional contact with the internal ring in order to apply a resistant torque during the rotation of the internal ring relative to the external ring.

2. The bearing device according to claim 1, wherein the at least one pretensioning element is annular and further comprises a rectangular cross-section with a bore in frictional contact with the internal ring, the at least one pretensioning element being located on only one axial side of the external ring.

3. The bearing device according to claim 1, wherein the pretensioning element is annular and further comprises a first portion having an axial length which is strictly greater than the axial length of a second portion which extends from the first portion to the inner side of the bearing and which has a bore in frictional contact with the internal ring.

4. The bearing device according to claim 3, wherein the second portion of the pretensioning element is formed from a root on the first portion that is axially offset towards the rolling elements.

5. The bearing device according to claim 3, wherein the second portion of the pretensioning element has at least one bent portion in frictional contact with the internal ring.

6. The bearing device according to claim 1, wherein an internal surface of the at least one pretensioning element forms a bore, the internal surface comprising projections in frictional contact with the internal ring.

7. The bearing device according to claim 1, wherein the pretensioning element is retained by means of an axial retention portion.

8. The bearing device according to claim 7, wherein the casing is provided with the axial retention portion which is formed from the end of the radial portion against which the pretensioning element is compressed and which extends axially in the direction of the rolling elements.

9. The bearing device according to claim 7, wherein the axial retention portion is an element that is inserted inside the material of the pretensioning element.

10. The bearing device according to claim 7, wherein the pretensioning element comprises a first portion and a second portion which extends from the first portion to the inner side of the bearing, and wherein the axial retention portion is positioned in the first portion and is extended by a radial retention portion into the second portion, the radial retention portion is formed from an end of the axial retention portion and extends substantially radially in the direction of the inner side of the bearing.

11. A bearing device mounted to a steering column for a motor vehicle, the bearing device comprising:
   a casing provided with an axial portion and two radial portions at the ends thereof, wherein the axial portion of the casing is of constant diameter such that the two radial portions connect to the axial portion at a same radial distance from a central axis of the bearing device, the axial portion having a radially outer axially extending surface,
   an internal ring located within the casing against the radially outer axially extending surface, the internal ring being formed by two bearing elements, each bearing element forming an internal ring bearing path;
   an external ring located within the casing having an external ring bearing path;
   rolling elements, wherein the rolling elements are arranged between the internal ring and the external ring and in contact with the internal ring bearing path and the external ring bearing path;
   at least one pretensioning element which is produced from resilient material and which is arranged between one of the radial portions of the casing and one of the two bearing elements of the internal ring such that the at least one pretensioning element exerts only an axial force on the internal ring and that the at least one pretensioning element only contacts the internal ring on a surface over which the axial force is being applied, the pretensioning element is further arranged such that in an installed state an inner radial surface of the pretensioning element is not in contact with the radially outer axially extending surface and is also not in contact with the internal ring, and
   wherein the at least one pretensioning element is mounted in the casing and in frictional contact with the external ring in order to apply a resistant torque during the rotation of the internal ring relative to the external ring.

12. The bearing device according to claim 11, wherein the at least one pretensioning element is annular and further comprises a rectangular cross-section with a radially outer surface in frictional contact with the external ring.

13. The bearing device according to claim 11, wherein the pretensioning element is annular and further comprises a first portion having an axial length which is strictly greater than the axial length of a second portion which extends from the first portion to the external ring of the bearing and which has a radially outer surface in frictional contact with the external ring.

14. The bearing device according to claim 13, wherein the second portion of the pretensioning element has at least one bent portion in frictional contact with the external ring.

15. The bearing device according to claim 11, wherein an external surface of the at least one pretensioning element forms a radially outer surface, the radially outer surface comprising projections in frictional contact with the external ring.

16. A bearing device mounted in a rotary engine, the bearing device comprising:
   a casing provided with an axial portion and two radial portions at the ends thereof, wherein the axial portion of the casing is of constant diameter such that the two radial portions connect to the axial portion at a same radial distance from a central axis of the bearing device, the axial portion having a radially inner axially extending surface,
   an internal ring located within the casing and having an internal ring bearing path;
   an external ring located within the casing, the external ring being formed by two bearing elements disposed against the radially inner axially extending surface, each bearing element forming an external ring bearing path;
   rolling elements, wherein the rolling elements are arranged between the internal ring and the external ring and in contact with the internal ring bearing path and the external ring bearing path;
   at least one pretensioning element which is produced from resilient material and which is arranged between one of the radial portions of the casing and one of the two bearing elements of the external ring such that the at least one pretensioning element exerts only an axial force on the external ring and that the at least one pretensioning element only contacts the external ring on a surface over which the axial force is being applied, the pretensioning element is further arranged such that in an installed state an outer radial surface of the pretensioning element is not in contact with the radially inner axially extending surface and is also not in contact with the external ring, and
   wherein the at least one pretensioning element is mounted in the casing and in frictional contact with the internal ring in order to apply a resistant torque during the rotation of the internal ring relative to the external ring; and
   the rotary engine comprising:
   a fixed housing,
   a distribution crankshaft at the output of the rotary engine, and
   an external pulley driven by the rotary engine by means of the distribution crankshaft
   wherein the bearing device is arranged radially between the distribution crankshaft and the fixed housing at the output of the rotary engine.

17. The bearing device according to claim 16, wherein the at least one pretensioning element is annular and further comprises a rectangular cross-section with a bore in frictional contact with the internal ring.

18. The bearing device according to claim 16, wherein the pretensioning element is annular and further comprises a first portion having an axial length which is strictly greater than the axial length of a second portion which extends from the first portion to the inner side of the bearing and which has a bore in frictional contact with the internal ring.

19. The bearing device according to claim 18, wherein the second portion of the pretensioning element has at least one bent portion in frictional contact with the internal ring.

20. The bearing device according to claim 16, wherein an internal surface of the at least one pretensioning element forms a bore, the internal surface comprising projections in frictional contact with the internal ring.

* * * * *